(12) United States Patent
Weitherspoon et al.

(10) Patent No.: US 11,662,266 B2
(45) Date of Patent: May 30, 2023

(54) WATER HEATER WITH AN INTEGRATED LEAK DETECTION SYSTEM

(71) Applicant: Rheem Manufacturing Company, Atlanta, GA (US)

(72) Inventors: Damian Weitherspoon, Montgomery, AL (US); Jessie L. Dixon, Montgomery, AL (US); Nahoko Maciulewicz, Wetumpka, AL (US); Shreya Gharia, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 512 days.

(21) Appl. No.: 16/719,543

(22) Filed: Dec. 18, 2019

(65) Prior Publication Data

US 2021/0190625 A1   Jun. 24, 2021

(51) Int. Cl.
*G01M 3/00* (2006.01)
*F24H 9/17* (2022.01)
*G01M 3/18* (2006.01)

(52) U.S. Cl.
CPC .............. *G01M 3/002* (2013.01); *F24H 9/17* (2022.01); *G01M 3/188* (2013.01)

(58) Field of Classification Search
CPC .......... G01M 3/002; G01M 3/188; F24H 9/17
See application file for complete search history.

(56) References Cited

U.S. PATENT DOCUMENTS

| | | | | |
|---|---|---|---|---|
| 3,770,002 A * | 11/1973 | Brown | .................... | G01M 3/16 307/118 |
| 5,315,291 A * | 5/1994 | Furr | ........................ | G01M 3/16 340/604 |
| 5,325,810 A * | 7/1994 | Bannister | .............. | G01M 3/042 116/200 |
| 5,345,224 A * | 9/1994 | Brown | ...................... | F24H 9/17 73/40 |
| 5,844,492 A * | 12/1998 | Buffin, Sr. | ............ | F24H 9/2035 340/634 |
| 5,877,689 A * | 3/1999 | D'Amico | .............. | F24H 9/2007 73/317 |

(Continued)

OTHER PUBLICATIONS

International Search Report and Written Opinion issued for PCT Application No. PCT/US2020/065505 dated Apr. 8, 2021.

*Primary Examiner* — Nathaniel T Woodward
*Assistant Examiner* — Philip L Cotey
(74) *Attorney, Agent, or Firm* — Eversheds Sutherland (US) LLP

(57) ABSTRACT

A water heater includes a tank assembly that defines an insulation cavity between an inner storage tank and an outer jacket. The water heater includes a bottom pad that supports the tank assembly thereon. The bottom pad is disposed in a bottom pan. Gaskets are disposed between the bottom pad and the bottom pan of the water heater. The bottom pad and at least one of the gaskets include apertures that are configured to internally route a leak sensor assembly of the water heater from the bottom pan to a controller of the water heater through the insulation cavity while preventing a leak of insulation material from the insulation cavity to the bottom pan. The water heater also includes a mounting bracket that is coupled to the inner storage tank to securely hold and route a portion of the leak sensor assembly disposed in the insulation cavity to the controller.

20 Claims, 12 Drawing Sheets

(56) References Cited

U.S. PATENT DOCUMENTS

| | | | | |
|---|---|---|---|---|
| 5,924,392 | A | * | 7/1999 | Hall ........................ F24H 1/182 122/494 |
| 6,265,699 | B1 | * | 7/2001 | Scott .................... H05B 1/0283 219/486 |
| 6,877,359 | B2 | * | 4/2005 | Huang .................... G01M 3/16 73/40 |
| 7,373,080 | B2 | * | 5/2008 | Baxter ..................... H05B 3/78 392/441 |
| 8,319,626 | B1 | * | 11/2012 | Cantolino ................. F24H 9/17 122/13.01 |
| 10,753,647 | B2 | * | 8/2020 | Gardner .................... F24H 9/17 |
| 2005/0147402 | A1 | * | 7/2005 | Baxter ................. F24H 9/2021 392/454 |
| 2007/0261241 | A1 | * | 11/2007 | Akkala ................ F24H 9/2035 29/890.03 |
| 2014/0209767 | A1 | * | 7/2014 | Foster ................... F24H 9/2007 248/220.21 |
| 2018/0231430 | A1 | * | 8/2018 | Kim ....................... G08B 19/00 |
| 2018/0259222 | A1 | * | 9/2018 | Murphy ................. F24H 9/136 |
| 2019/0145661 | A1 | * | 5/2019 | Gardner ............... F24H 9/2007 122/14.3 |
| 2019/0145662 | A1 | * | 5/2019 | Gardner ............... G01M 3/165 122/507 |
| 2019/0195533 | A1 | * | 6/2019 | Gardner ............... F24H 9/2007 |
| 2020/0003432 | A1 | * | 1/2020 | Nolte ..................... F24H 1/182 |

* cited by examiner

WATER HEATER WITH AN INTEGRATED LEAK DETECTION SYSTEM

TECHNICAL FIELD

The present disclosure relates generally to water heaters, and more particularly to a water heater with an integrated leak detection system.

BACKGROUND

A water heater may be subject to deterioration over the course of its life. Such deterioration may compromise the integrity of the water heater and may cause water that is stored in a storage tank of the water heater to leak. For example, the water may leak from the storage tank and eventually pool at the base of the water heater. If left undetected and unattended, such leaks may result in damage to furniture, electrical equipment, the water heater itself, and/or other property which may result in costly repairs. Further, these leaks can create a hazardous working environment for persons near the leak.

Existing water heaters may include a leak detection system that is configured to detect a leak condition, i.e., a water leak from the water heater. However, the leak detection system is typically provided as a separate accessory that a user installs on site. If the user fails to install the leak detection system or installs the leak detection system incorrectly, the leak sensing functionality of the water heater is negated. Further, in existing water heaters leak detection systems may be routed externally which makes the leak detection system vulnerable to being tampered with or to being inadvertently disabled and thereby negating the leak sensing functionality of the water heater. Furthermore, in existing water heaters, the leak detection systems are not easily replaceable.

This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure relates to a water heater. The water heater includes a tank assembly. The tank assembly includes an inner storage tank, and an outer jacket that is disposed peripherally around the inner storage tank. The outer jacked is disposed such that an insulation cavity is defined between the inner storage tank and the outer jacket. Further, the water heater includes a bottom pan disposed below the tank assembly such that the bottom pan serves as a base of the water heater. Furthermore, the water heater includes a bottom pad that is disposed between the tank assembly and the bottom pan. The bottom pad creates a seal that prevents leaking of an insulation material from the insulation cavity to the bottom pan. The bottom pad comprises an aperture that is configured to internally route a leak sensor assembly of the water heater from the bottom pan, through the insulation cavity, and to a controller of the water heater.

In another aspect, the present disclosure relates to a water heater. The water heater includes a tank assembly. The tank assembly includes an inner storage tank, and an outer jacket that is disposed peripherally around the inner storage tank such that an insulation cavity is defined between the inner storage tank and the outer jacket. Further, the water heater includes a bottom end assembly that defines a base of the water heater. The bottom end assembly includes a bottom pan disposed below the tank assembly, and a bottom pad that is disposed between the tank assembly and the bottom pan. The bottom pad creates a seal that prevents leaking of an insulation material from the insulation cavity to the bottom pan and comprises an aperture that is configured to internally route a leak sensor assembly of the water heater from the bottom pan to a controller of the water heater through the insulation cavity of the water heater. Furthermore, the water heater includes a mounting bracket that is coupled to the inner storage tank and configured to securely hold and route a portion of the leak sensor assembly that is disposed in the insulation cavity towards the controller of the water heater.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
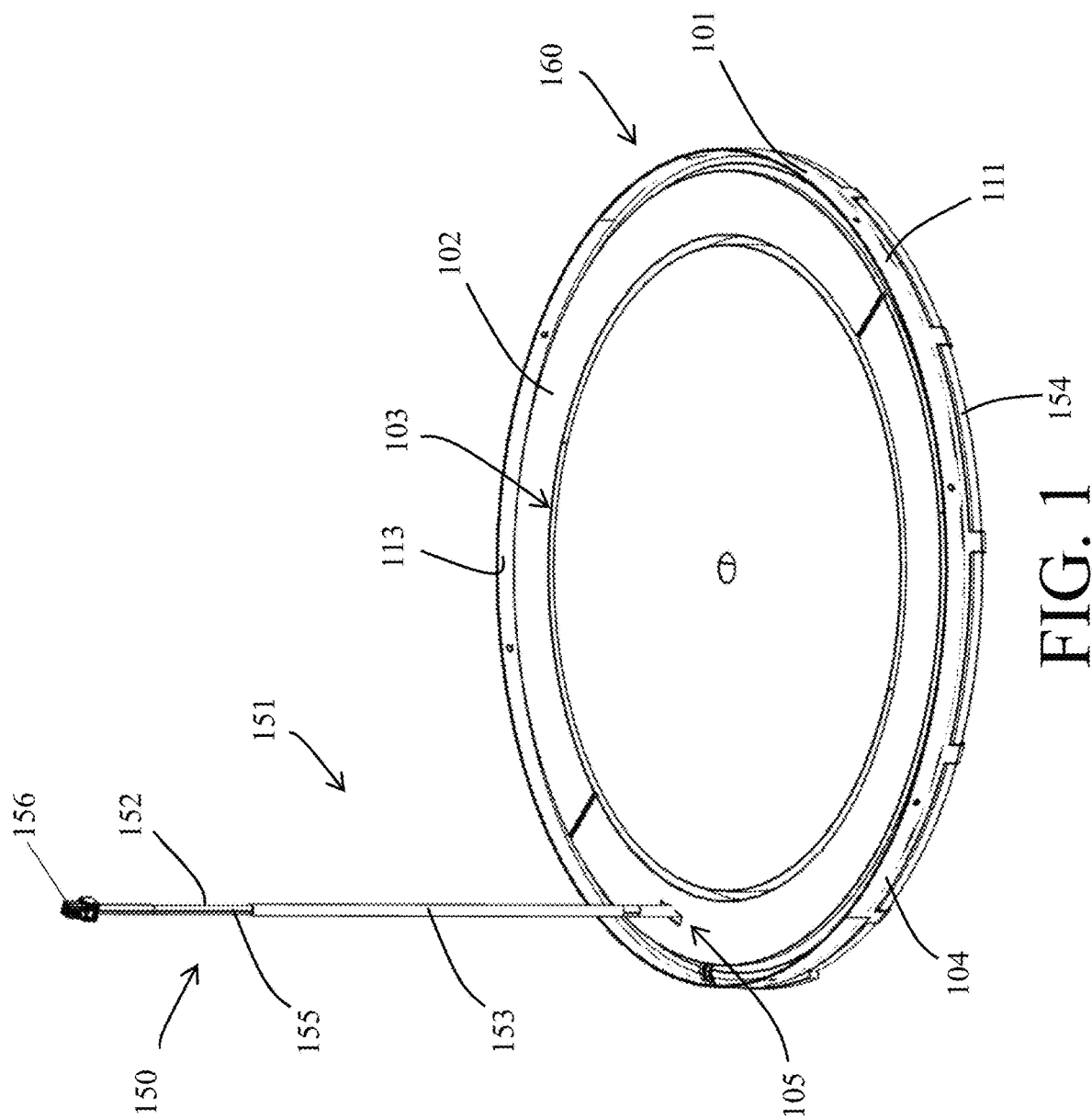
FIG. 1 illustrates a top perspective view of an example integrated leak detection system that is disposed in a bottom end assembly of a water heater, in accordance with example embodiments of the present disclosure.
Figure 2:
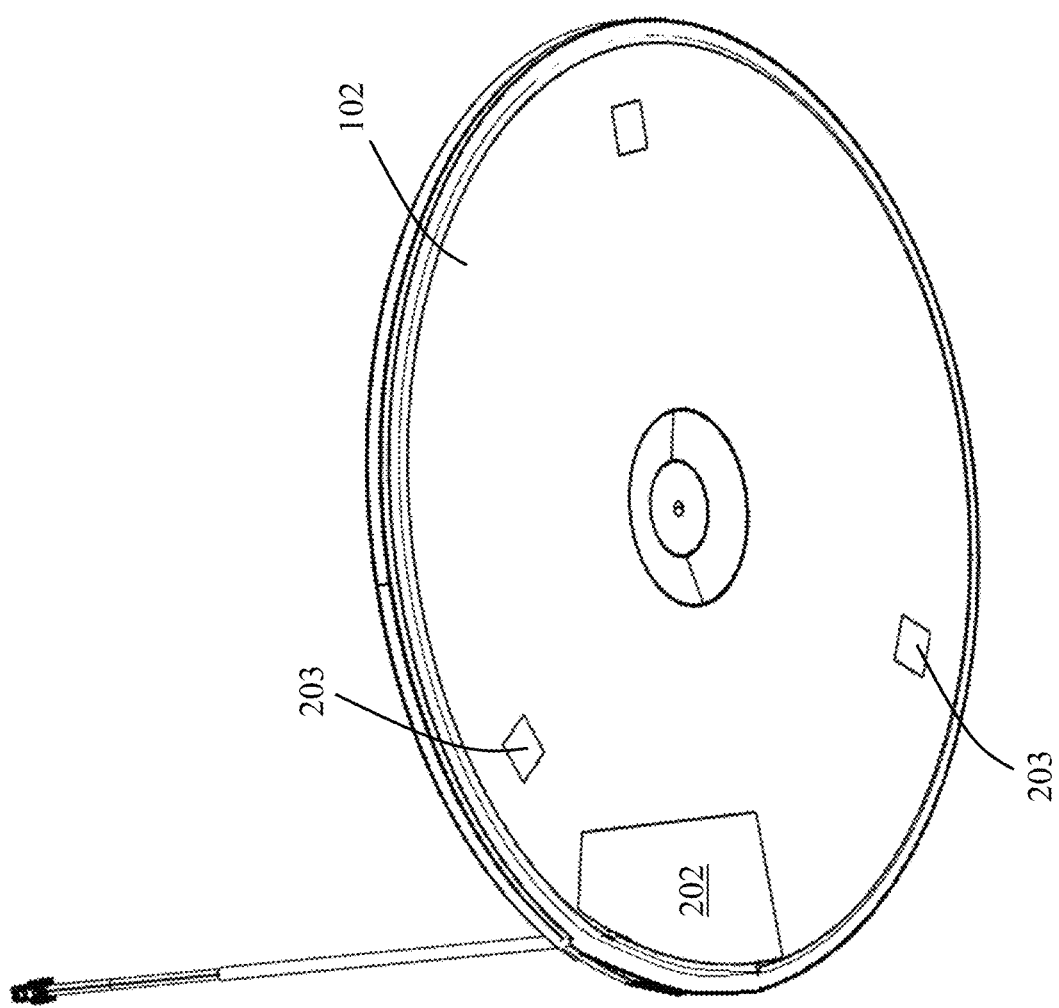
FIG. 2 illustrates a bottom perspective view of the example integrated leak detection system disposed in the bottom end assembly with the bottom pan having been removed therefrom to illustrate a bottom surface of a bottom pad of the bottom end assembly, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis is instead placed on clearly illustrating the principles of the example embodiments. Additionally, certain dimensions or positions may be exaggerated to help visually convey such principles.

DETAILED DESCRIPTION

The present disclosure describes a water heater with an integrated leak detection system. In certain example embodiments, the integrated leak detection system includes a leak sensor assembly that is internally routed from a bottom pan of the water heater to a controller of the water heater through an insulation cavity of the water heater. In said example embodiment, the internal routing minimizes inadvertent disablement or tampering of the leak detection system, thereby improving safety of the water heater. Further, in said example embodiment, the leak sensor assembly is integrated with the water heater. Such an integration ensures that the leak detection system is installed when the water heater leaves the manufacturing facility and remains connected to the water heater by default which minimizes the possibility that a user would fail to install the leak sensor on-site. In certain example embodiments, the water heater also includes a mounting bracket that is configured to support and route the leak sensor assembly to the controller in the insulation cavity, provide a place to couple a protective cover for the terminals of the heating element thereto, and hold a thermistor against an inner storage tank of the water heater. In said example embodiments, the mounting bracket enables easy assembly of the water heater and also aids to minimize the number of components in the water heater, thereby making the water heater cost efficient. Furthermore, the leak sensor assembly is configured to allow easy replacement of the leak sensor when needed.

In one example, the integrated leak detection system includes a leak sensor assembly. One end of the leak sensor assembly is disposed in a bottom pan of the water heater and an opposite end of the leak sensor assembly is coupled to a controller of the water heater. The end of the leak sensor assembly that is disposed in the bottom pan extends along a perimeter of the bottom pan to create a circumferential area of leak detection around the water heater. The controller is configured to control an operation of the water heater based on input received from the leak sensor assembly. The leak sensor assembly is routed from the bottom pan to the controller through an insulation cavity formed between an inner storage tank and an outer jacket of a tank assembly of the water heater. The leak sensor assembly is routed internally via a bottom end assembly that includes a bottom pad and gaskets that are disposed between the bottom pan and a bottom end of the tank assembly. The bottom pad is configured to prevent insulation foam (liquid) from leaking from the insulation cavity to the bottom pan, while allowing the leak sensor assembly to be routed therethrough to the insulation cavity. The water heater also includes a mounting bracket that is coupled to the inner storage tank and disposed in the insulation cavity. The mounting bracket has features to support and manage the routing of the leak sensor assembly to the controller through the insulation cavity. The mounting bracket also has features to support the mounting of a protective cover that extends over the terminals of a heating element of the water heater. The mounting bracket additionally includes features to securely retain a thermistor in contact with or against the inner storage tank of the water heater.

Example embodiments of the water heater with the integrated leak detection system will be described more fully hereinafter with reference to the accompanying drawings that describe representative embodiments of the present technology. If a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

The technology of the water heater with the integrated leak detection system may be embodied in many different forms and should not be construed as being limited to the embodiments set forth herein; rather, these embodiments are provided so that this disclosure will be thorough and complete, and will fully convey the scope of the technology to those appropriately skilled in the art. Further, example embodiments of the present disclosure can be used for any size (e.g., capacity) of water heater. Furthermore, example embodiments of the present disclosure can be located in any type of environment (e.g., warehouse, attic, garage, storage, mechanical room, basement) for any type (e.g., commercial, residential, industrial) of user. Water heaters used with example embodiments can include both electric and/or fuel fired water heaters that can be used for one or more of any number of processes (e.g., automatic clothes washers, automatic dishwashers, showers, sink faucets, heating systems, humidifiers).

Water heaters (or components thereof, including controllers) described herein can be made of one or more of a number of suitable materials to allow that device and/or other associated components of a system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Further, components of the water heater and/or the integrated leak detection system (or portions thereof) described herein can be made from a single piece (as from a mold, injection mold, die cast, or extrusion process). In addition, or in the alternative, components of the water heater and/or the integrated leak detection system (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Terms such as "first", "second", "third", "top", "bottom", "side", and "within" are used merely to distinguish one component (or part of a component or state of a component) from another. Such terms are not meant to denote a preference or a particular orientation and are not meant to limit embodiments of water heaters with integrated leak detection systems. In the following detailed description of the example embodiments, numerous specific details are set forth in order to provide a more thorough understanding of the present disclosure. However, it will be apparent to one of ordinary skill in the art that the integrated leak detection systems of the present disclosure may be practiced without these specific details. In other instances, well-known features have not been described in detail to avoid unnecessarily complicating the description.

Turning now to the figures, example embodiments of a water heater with the integrated leak detection system will be described in association with FIGS. 1-12. FIGS. 1-5 illustrate an example integrated leak detection system that is internally routed from the bottom pan to the controller through the insulation cavity via a bottom end assembly of the water heater; and FIGS. 6-11 illustrate the mounting bracket of the water heater that supports and routes a leak sensor assembly of the leak detection system within the insulation cavity.

Referring to FIGS. 1-12, a water heater 500 (illustrated in FIG. 5) may include a tank assembly 501 and a bottom end assembly 160 (illustrated in FIGS. 1 and 5) that is disposed below the tank assembly 501. The bottom end assembly 160 may form a base of the water heater 500. The tank assembly 501 may include an inner storage tank 601 (illustrated in FIG. 6) that is configured to store water that is to be heated by the water heater 500. The tank assembly 501 may further include an outer jacket 503 that peripherally surrounds the inner storage tank 601 such that an annular insulation cavity 1201 is formed between the inner storage tank 601 and the outer jacket 503. The outer jacket 503 may be larger in diameter than the inner storage tank 601. The insulation cavity 1201 may extend from a top end 1202 (illustrated in FIG. 12) to a bottom end 1203 of the inner storage tank 601. In certain example embodiments, the inner storage tank 601 and the outer jacket 503 may be substantially cylindrical in shape. However, in other example embodiments, the inner storage tank 601, and the outer jacket 503, and the insulation cavity 1201 formed between the outer jacket 503 and the inner storage tank 601 may have any other appropriate shape without departing from a broader scope of the present disclosure.

The bottom end assembly 160 may include a bottom pan 101 (illustrated in FIG. 1 and a bottom pad 102 that is disposed in the bottom pan 101. Further, the bottom end assembly 160 may include a first gasket 302 (illustrated in FIG. 3) and second gasket 202 (illustrated in FIGS. 2 and 3) that are disposed between (e.g., sandwiched between) the bottom pad 102 and the bottom pan 101. In particular, the bottom pad 102, the first gasket 302, and the second gasket 202 may be disposed between a bottom end 1204 (illustrated in FIG. 12) of the tank assembly 501 and the bottom pan 101.

In certain example embodiments, the bottom pad 102 may be configured to support the inner storage tank 601. As such, in said example embodiments, the bottom pad 102 may include a tank retaining slot 103 as illustrated in FIG. 1. The tank retaining slot 103 is configured to receive and seat a periphery of a bottom end of the inner storage tank 601 therein. The tank retaining slot 103 may be configured to centrally align the inner storage tank 601 within the bottom end assembly 160. Further, in said example embodiments, the bottom pad 102 may include plastic inserts 203 (illustrated in FIG. 2) disposed below the tank retaining slot 103. The plastic inserts 203 are spaced 120° apart from each other and are configured to support, balance, and securely retain the inner storage tank thereon. In some example embodiments, the inserts may be formed using any other appropriate material. Further, in some example embodiments, fewer or more inserts may be used without departing from a broader scope of the present disclosure.

Figure 4:
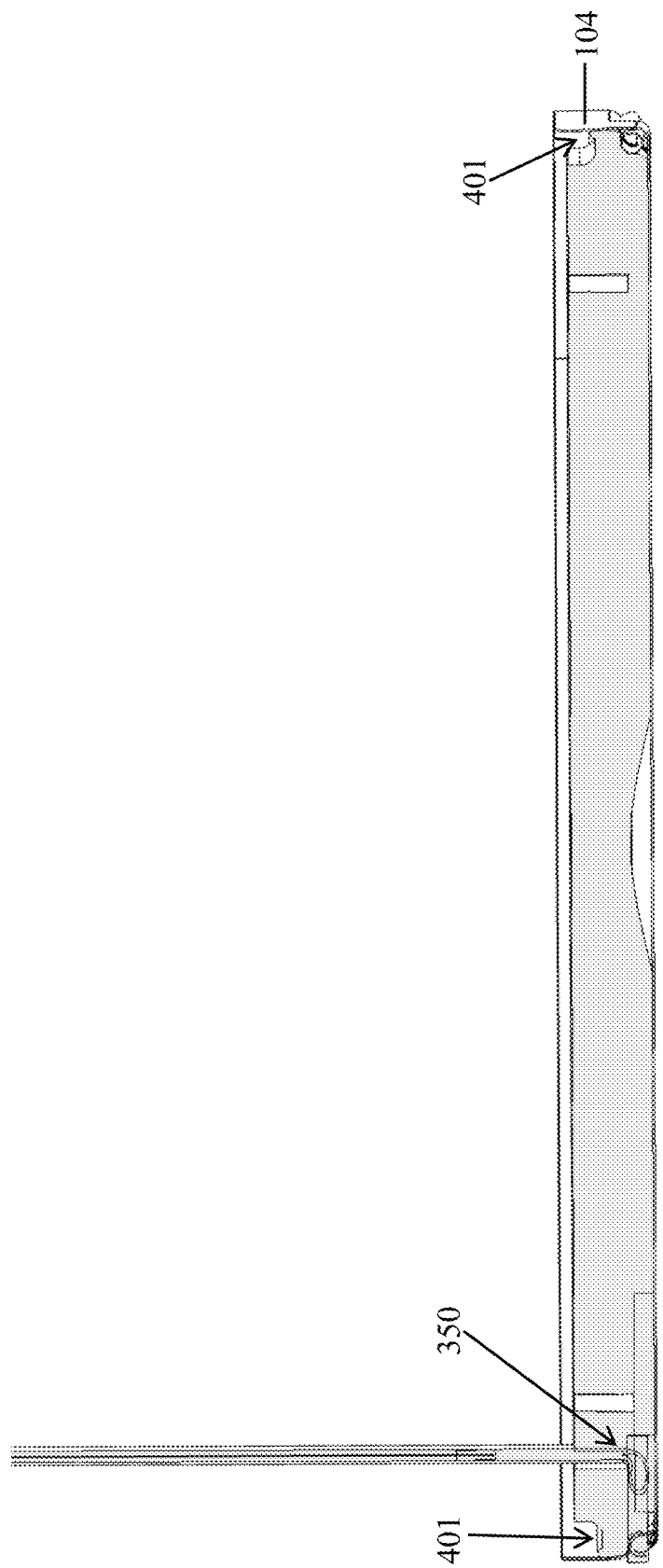
FIG. 4 illustrates a cross-section view of the example integrated leak detection system disposed in the bottom end assembly, in accordance with example embodiments of the present disclosure.
Figure 5:
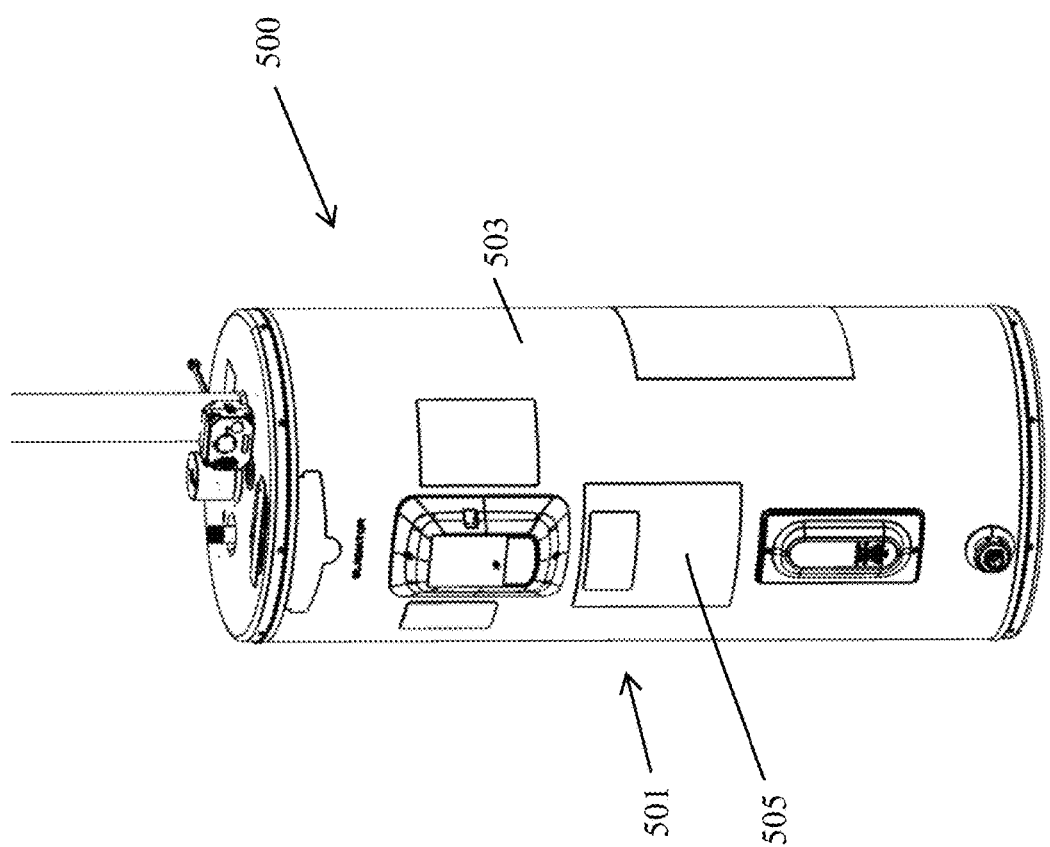
FIG. 5 illustrates the example water heater comprising a mounting bracket disposed therein along with the leak detection system and bottom end assembly of FIG. 1, in accordance with example embodiments of the present disclosure.

In certain example embodiments, the bottom pad 102 may also support the outer jacket 503 of the tank assembly 501 such that the bottom pad 102 creates a seal 401 (illustrated in FIG. 4) between the bottom pan 101 and the insulation cavity 1201. As illustrated in FIG. 4, the seal 401 may be created between a sidewall 104 of the bottom pan 101 and an outer edge 301 of the bottom pad 102. The seal 401 may be configured to prevent leak of an insulation material from the insulation cavity 1201 of the tank assembly 501 to the bottom pan 101, e.g., when insulation material (liquid) is injected in between the inner storage tank 601 and the outer jacket 503 to rise and fill the insulation cavity 1201.

In certain example embodiments, in addition to creating a seal 401 that prevents the insulation material from leaking from the insulation cavity 1201 to the bottom pan 101, the bottom pad 102 may define a portion of a routing path 350 (illustrated in FIG. 3) that allows a leak sensor assembly 151 of the leak detection system 150 to be routed from the bottom pan 101 to a controller 505 (illustrated in FIG. 5) of the water heater 500 through the insulation cavity 1201. The portion of the routing path 350 that is defined by the bottom pad 102 may include a first routing aperture 105 that is formed in the bottom pad 102. A remainder of the routing path 350 may be defined by a second routing aperture 355 that is formed in a first gasket 302, and a second gasket 202. The routing path 350 may be configured to allow at least a portion of the leak sensor assembly 151 to pass therethrough from the bottom pan 101 to the insulation cavity 1201, while preventing insulation material in the insulation cavity 1201 from leaking into the bottom pan 101 through the routing path 350. In other words, the routing path 350 allows the leak sensor assembly 151 to be internally routed from the bottom pan 101 to the controller 505 through the insulation cavity 1201 of the tank assembly 501, while creating a seal that does not allow insulation material (liquid form) to pass from the insulation cavity 1201 to the bottom pan 101.

The first routing aperture 105 of the bottom pad 102 may be formed in a recessed portion 303 of the bottom pad 102. The recessed portion 303 and the first routing aperture 105 may be positioned within the bottom pad 102 such that when the water heater 500 is assembled (e.g., tank assembly 501 disposed on the bottom end assembly 160), the first routing aperture 105 of the bottom pad 102 is aligned with the insulation cavity 1201 of the tank assembly 501. In some example embodiments, the first gasket 302 may be configured to fit within the recessed portion 303 of the bottom pad 102. In said example embodiments, the shape of the first gasket 302 may substantially match the shape of the recessed portion 303 of the bottom pad 102. The first gasket 302 may be disposed in the recessed portion 303 of the bottom pad 102 such that the second routing aperture 355 of the first gasket 302 may be axially aligned with the first routing aperture 105 of the bottom pad 102. The second routing aperture 355 may be smaller than the first routing aperture 105 to prevent the leak of insulation material from the insulation cavity 1201 to the bottom pan 101 through the routing path 350.

Additionally, a second gasket 202 may be disposed below the first gasket 302. That is, the first gasket 302 may be attached to the bottom pad 102 and the second gasket 202 may be attached to the bottom pan 102. The shape of the second gasket 202 may or may not be similar to that of the first gasket 302. The second gasket 202 may be configured to further prevent the leak of insulation material from the insulation cavity 1201 to the bottom pan 101 through the routing path 350.

Figure 3:
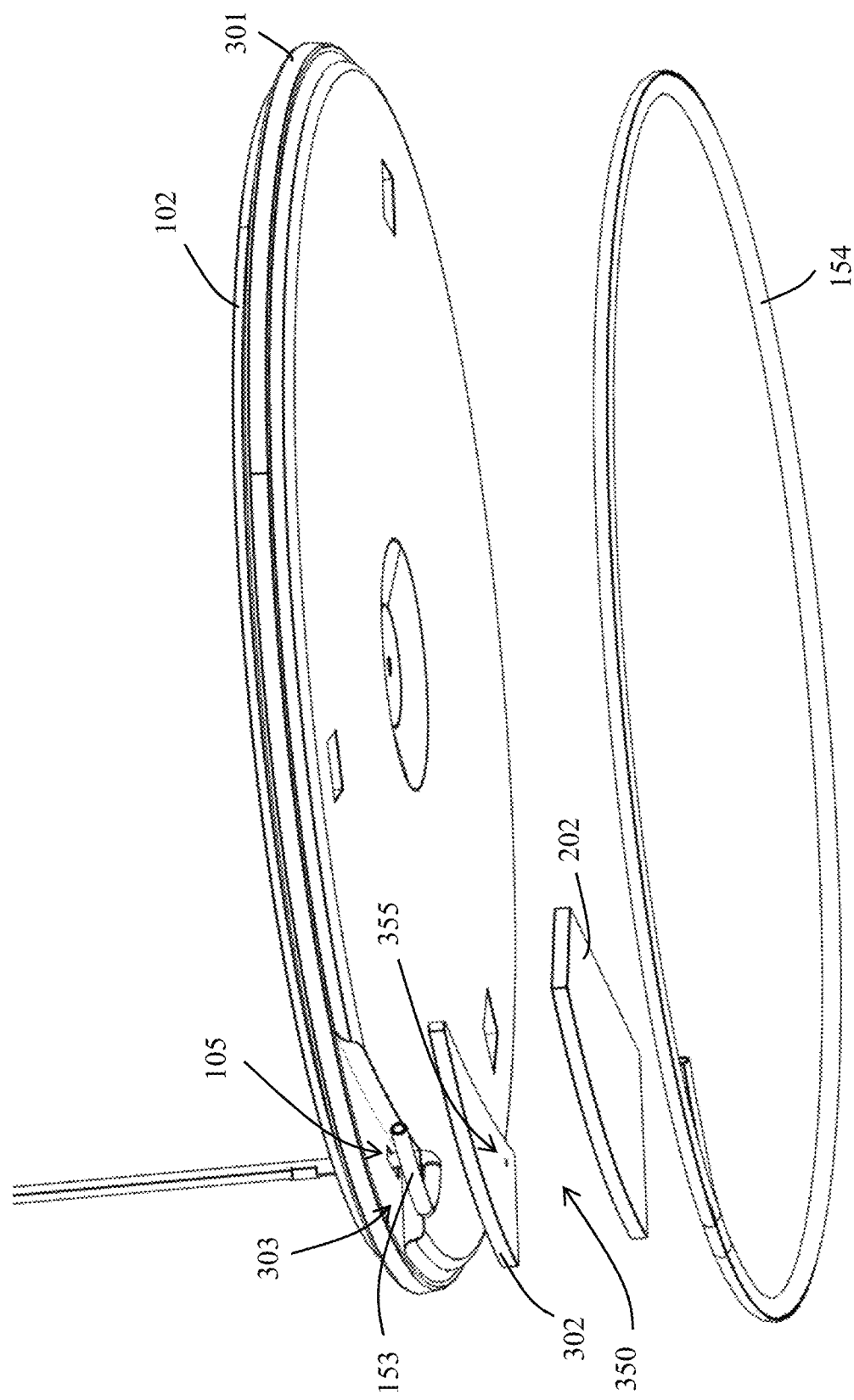
FIG. 3 illustrates an exploded view of the example integrated leak detection system disposed in the bottom end assembly with the bottom pan having been removed therefrom, in accordance with example embodiments of the present disclosure.

In certain example embodiments, the routing path 350 extends in between the first and second gaskets (202, 302), through the second routing aperture 355 of the first gasket 302, and through the first routing aperture 105 of the bottom pad 102 as illustrated in FIGS. 3 and 4. That is, as best seen in FIGS. 3 and 4, a leak sensor assembly 151 from the bottom pan 101 may be routed through the routing path 350 in between the first and second gaskets (202, 302), through the second routing aperture 355 of the first gasket 302, and through the first routing aperture 105 of the bottom pad 102 to the insulation cavity 1201 of the tank assembly 501.

In addition to the tank assembly 501 and the bottom end assembly 160, the water heater 500 may include the leak detection system 150. The leak detection system 150 may be configured to detect water (or any appropriate liquid) that leaks from the water heater 500. For example, the leak detection system 150 may be configured to detect water that leaks from the inner storage tank 601, the couplings or valve joints of the outer jacket 503, etc. As briefly described above, the leak detection system 150 may include a leak sensor assembly 151. In certain example embodiments, as illustrated in FIG. 3, the leak sensor assembly 151 may include a leak sensor 152, a sensor guiding tube 153, and a transport element 154.

In certain example embodiments, the transport element 154 may be formed using a material that can transport water or any appropriate liquid from a source point, i.e., point at which the water engages the transport element 154, to a destination point, e.g., point where the leak sensor 152 is coupled to the transport element 154. In the example embodiment illustrated in FIG. 3, the transport element 154 may include a tube that is formed using a wicking material that can transport the water that leaks from the water heater 500 towards the leak sensor 152. As such, hereinafter, the transport element 154 may be referred to as a wicking tube.

The leak sensor assembly 151 may be arranged such that one end of the sensor guiding tube 153 extends into the wicking tube 154 and the other end of the sensor guiding tube 153 receives the leak sensor 152 therein and guides the leak sensor 152 to the wicking tube 154. The leak sensor 152 may extend into a portion of the wicking tube 154. The remainder portion of the wicking tube 154 may extend circumferentially around a perimeter of the bottom pan 101. In some example embodiments, the bottom pan 101 may have a channel that is formed along the perimeter thereof to house the wicking material 154 therein. As best seen in FIG. 1, the channel may extend between on outer surface 111 and an inner surface 113 of the bottom pan 101. That is, the channel may be configured such that a portion of the wicking material 154 may be disposed inside the bottom pan 101 while a remainder portion of the wicking material 154 may be disposed outside the bottom pan 101 to capture both external or internal leaks (e.g., from the outer jacket 503 and the inner storage tank 601) of the water heater 500. However, one of skill in the art can understand and appreciate that in other example embodiments, the bottom pan 101 may have any other appropriate type of channel or alternatively may not include a dedicated channel for the wicking tube 154. The water that reaches the wicking tube 154 may be transported by the wicking tube 154 to the leak sensor 152 that is coupled to the wicking tube 154.

In contrast to conventional technology that requires numerous leak sensors around the water heater, using the wicking tube 154 to transport water to the leak sensor 152 provides faster and more comprehensive detection of leaks around the entire water heater 500. Further, the use of the wicking tube 154 allows the leak sensor 152 to have a small sensing segment which may be cost effective and may also contribute towards improving the efficiency of the leak detection system since the time required to dry the leak sensor and reset any alarms may be minimized. However, in some example embodiments, the leak sensor assembly 151 may not include the wicking tube 154. Instead, the leak sensor assembly 151 may include a leak sensor 152 that is long enough to extend circumferentially around the bottom pan 101 and to the controller 505 of the water heater 500 without departing from a broader scope of the present disclosure.

The sensor guiding tube 153 extends from the bottom pan 101 to the insulation cavity 1201 through the routing path 350. That is, from the wicking tube 154 in the bottom pan 101, the sensor guiding tube 153 extends in between the first and second gaskets (202, 302), and through the second routing aperture 355 of the first gasket 302 and the first routing aperture 105 of the bottom pad 102 to the insulation cavity 1201 of the tank assembly 501. In addition to guiding the leak sensor 152 to the wicking tube 154, the sensor guiding tube 153 may be configured to shield the leak sensor 152 from the insulation material in the insulation cavity 1201. Additionally, the sensor guiding tube 153 allows the leak sensor 152 to be easily replaced as needed.

In certain example embodiments, the leak sensor 152 may be a rope sensor that includes: (a) sensing segment 155 comprising metal sensing wires protected by a fiber material disposed around the sensing wires, and (b) a connector 156 (e.g., male or female connector) that is coupled to the sensing wires 155 and is disposed at one end of the rope sensor. In other example embodiments, the leak sensor 152 may include any other appropriate sensor that is configured to detect any appropriate liquid that leaks from the water heater 500.

Figure 6:
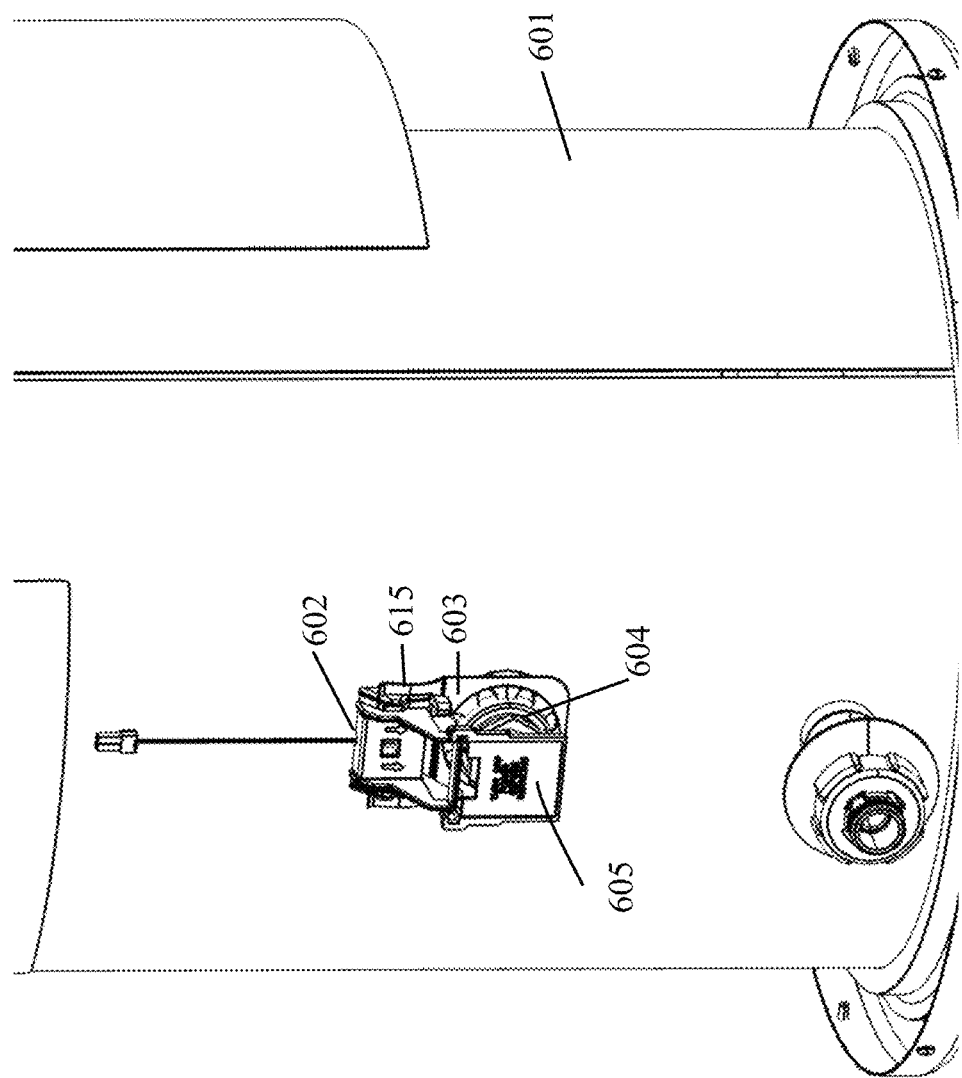
FIG. 6 illustrates an enlarged view of a bottom portion of the water heater with the outer jacket being removed therefrom to illustrate the mounting bracket, in accordance with example embodiments of the present disclosure.
Figure 7:
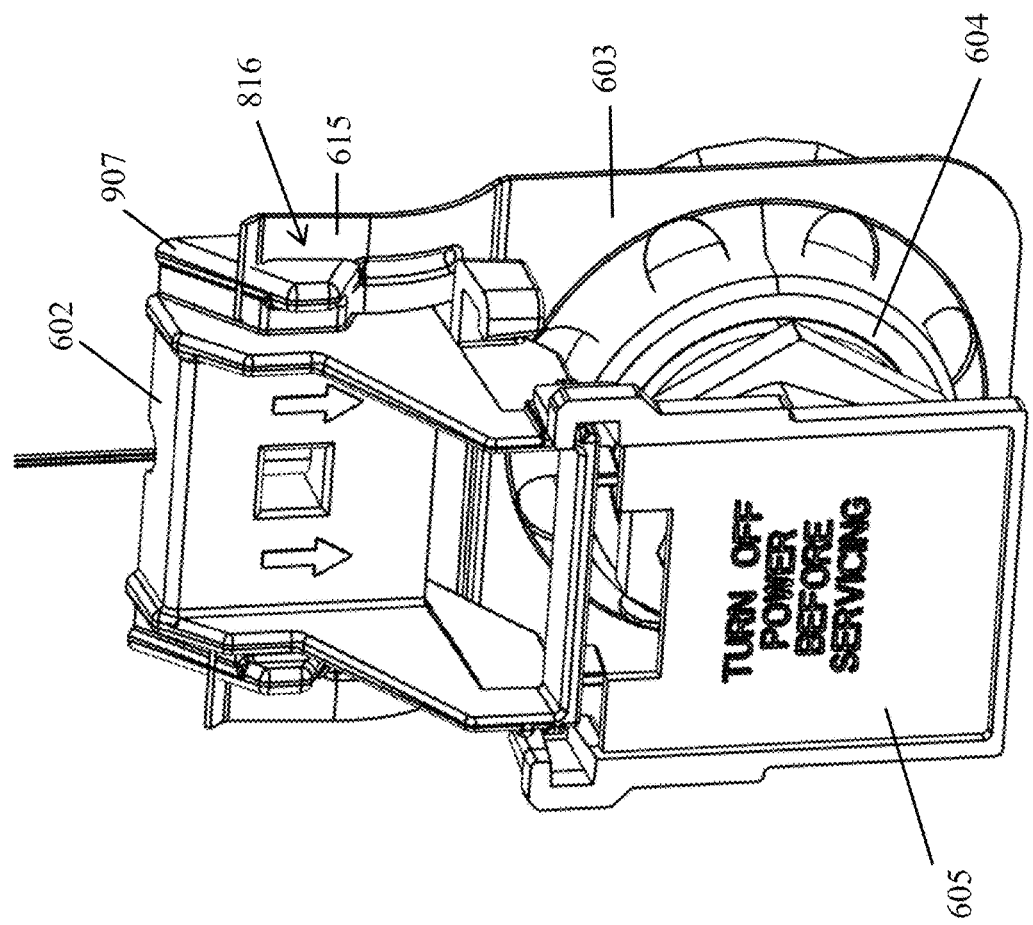
FIG. 7 illustrates the mounting bracket that is coupled to the inner storage tank of the example water heater, in accordance with example embodiments of the present disclosure.
Figure 8:
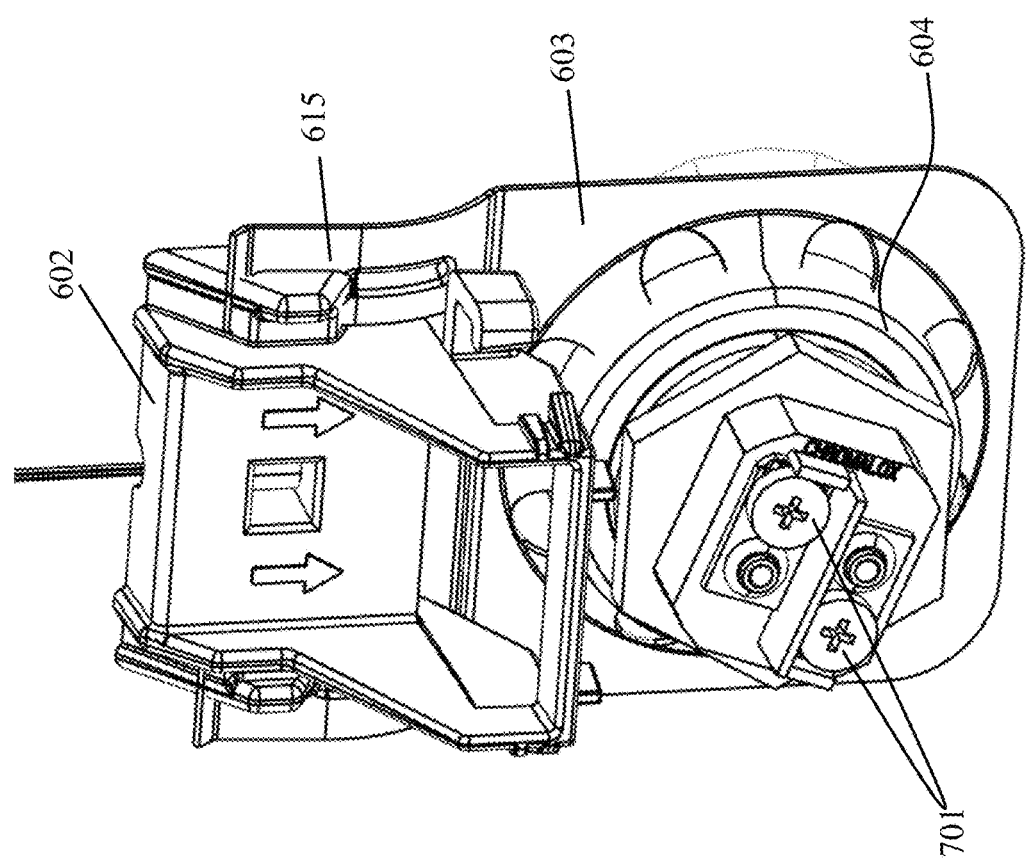
FIG. 8 illustrates the mounting bracket of FIG. 7 without the protective cover coupled to the mounting bracket, in accordance with example embodiments of the present disclosure.

As best seen in FIGS. 6-8, the portion of the leak sensor 152 that is disposed in the insulation cavity 1201 of the tank assembly 501 may be securely held and routed to the controller 505 of the water heater 500 by a mounting bracket 602. The mounting bracket 602 may be coupled to the inner storage tank 601 of the water heater 500. In particular, the mounting bracket 602 may be removably coupled to an element bracket 603 that is disposed around a heating element 604 of the water heater 500. In the example embodiment illustrated in FIGS. 6-8, the heating element 604 may be a lower heating element that is disposed at a lower portion of the water heater 500 and the element bracket 603 may be a clip that disposed around the heating element such that the arms 615 of the clip extend above the heating element 604. In said example embodiment, the mounting bracket 602 may be coupled to or clipped onto the arms 615 of the element bracket 603 such that the mounting bracket 602 is installed adjacent to and above the lower heating element 604.

One of skill in the art can understand and appreciate that in other example embodiments, the mounting bracket 602 may be coupled to the inner storage tank in any other appropriate manner using any other appropriate coupling mechanism without departing from a broader scope of the present disclosure. Further, in other example embodiments, the mounting bracket 602 may be installed above an upper heating element of the water heater without departing from a broader scope of the present disclosure, e.g., if the controller 505 is disposed above the upper heating element. In certain example embodiments, the water heater may include more than one mounting bracket 602 without departing from a broader scope of the present disclosure.

Figure 10:
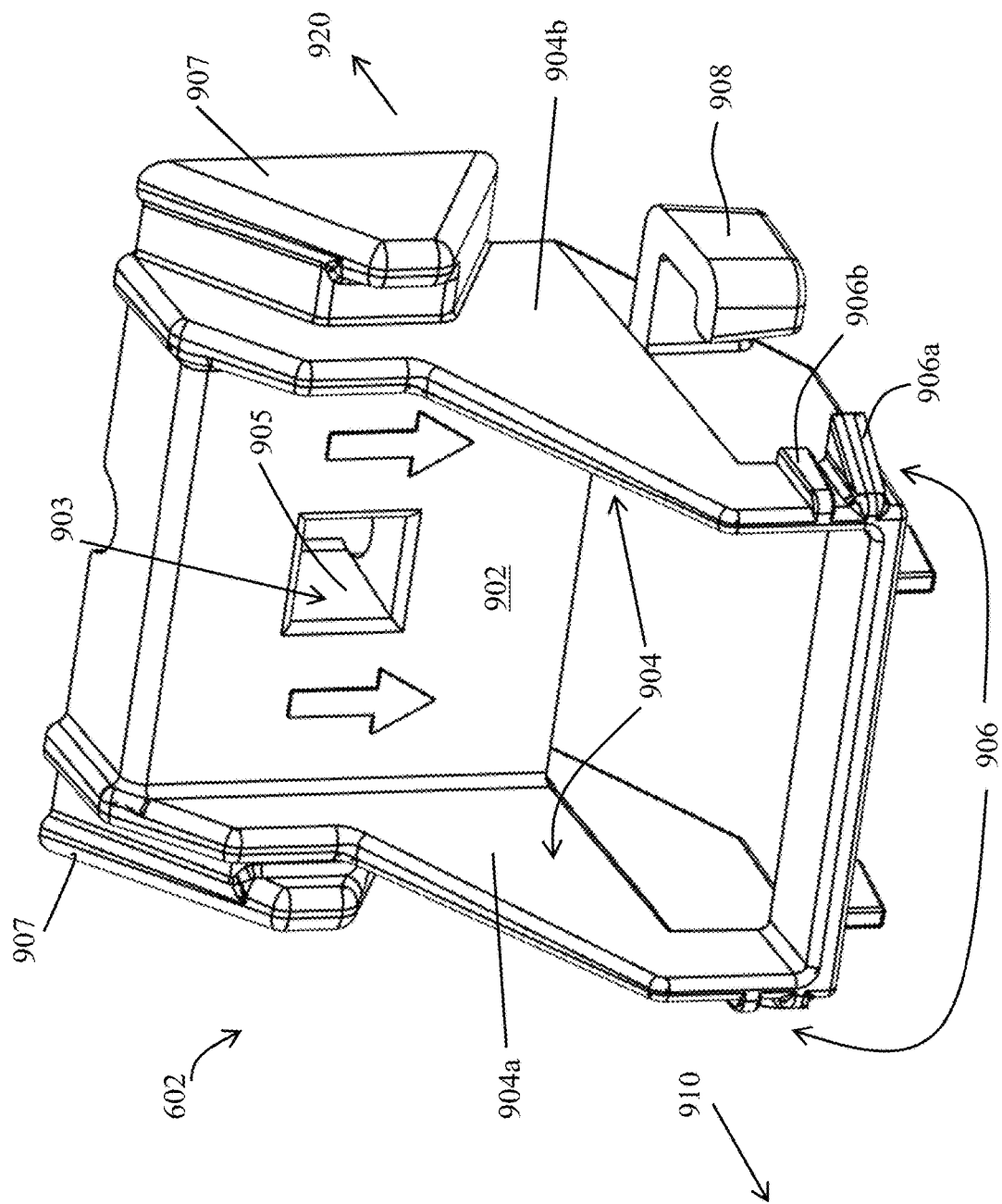
FIGS. 10 and 11 illustrate different perspective views of the mounting bracket, in accordance with example embodiments of the present disclosure.
Figure 11:
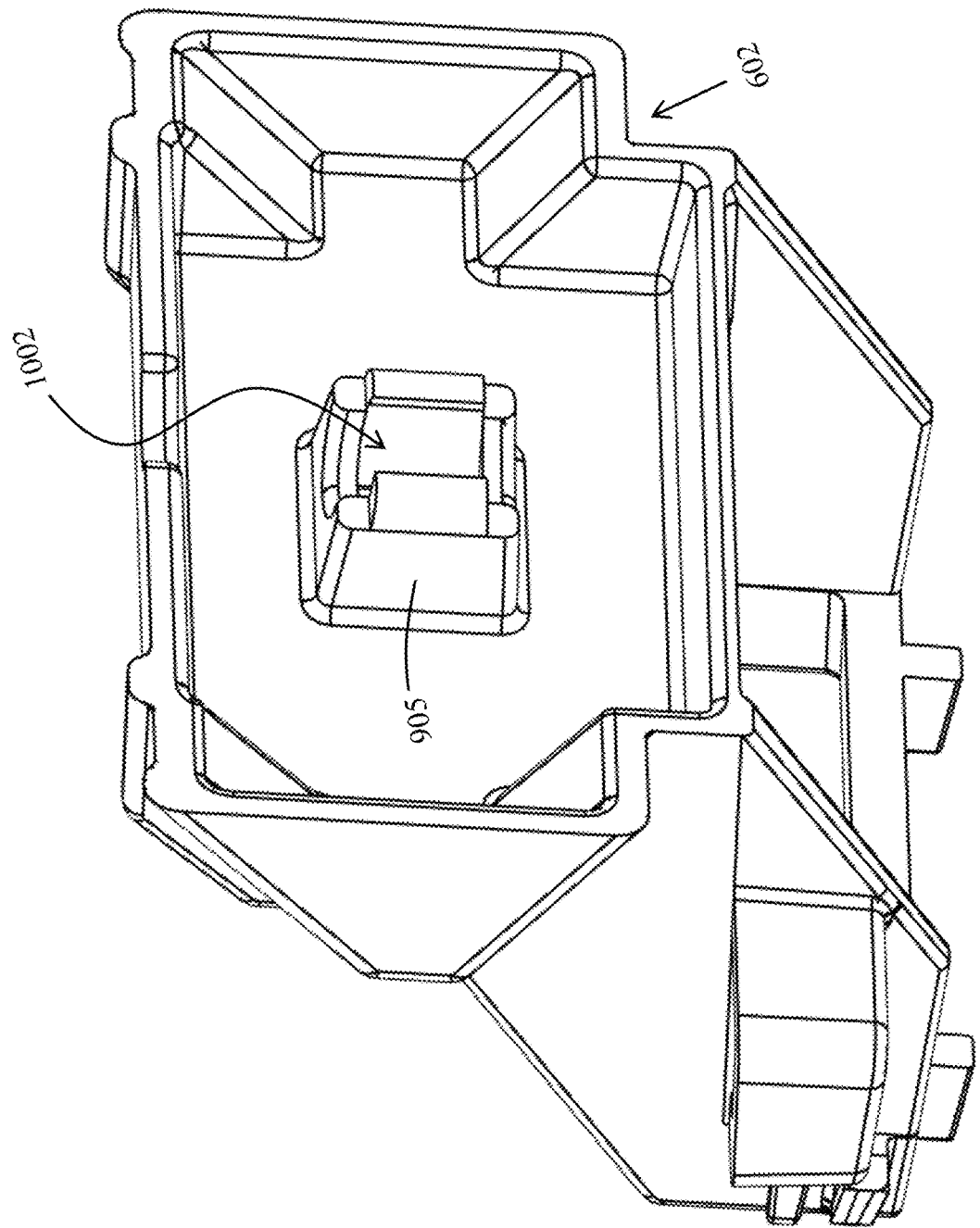
Figure 12:
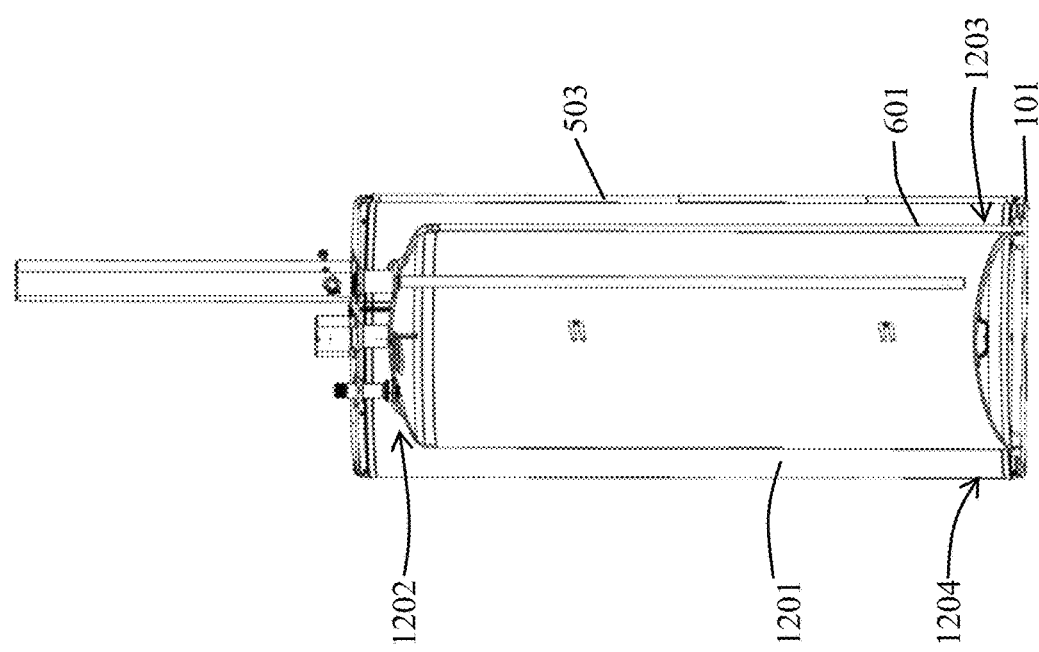
FIG. 12 illustrates a cross section view of the example water heater, in accordance with example embodiments of the present disclosure.

As illustrated in FIGS. 10-11, the mounting bracket 602 may include a base 902 and a pair of sidewalls 904 that extend out in a first direction from opposite edges of the base 902. Further, the mounting bracket 602 may include wings 907 that protrude or extend out in opposite directions from the sidewalls 904. The wings 907 may be configured to mate with the arms 615 of the element bracket 603 to couple the mounting bracket 602 to the element bracket 603. For example, the arms 615 of the element bracket 603 may include coupling apertures 816 (illustrated in FIG. 8) that are configured to receive a portion of the wings 907 therein to couple the mounting bracket 602 to the element bracket 603. However, as described above, any other appropriate coupling mechanism may be used to couple the mounting bracket 602 to the inner storage tank 601 and/or the element bracket 603.

Figure 9:
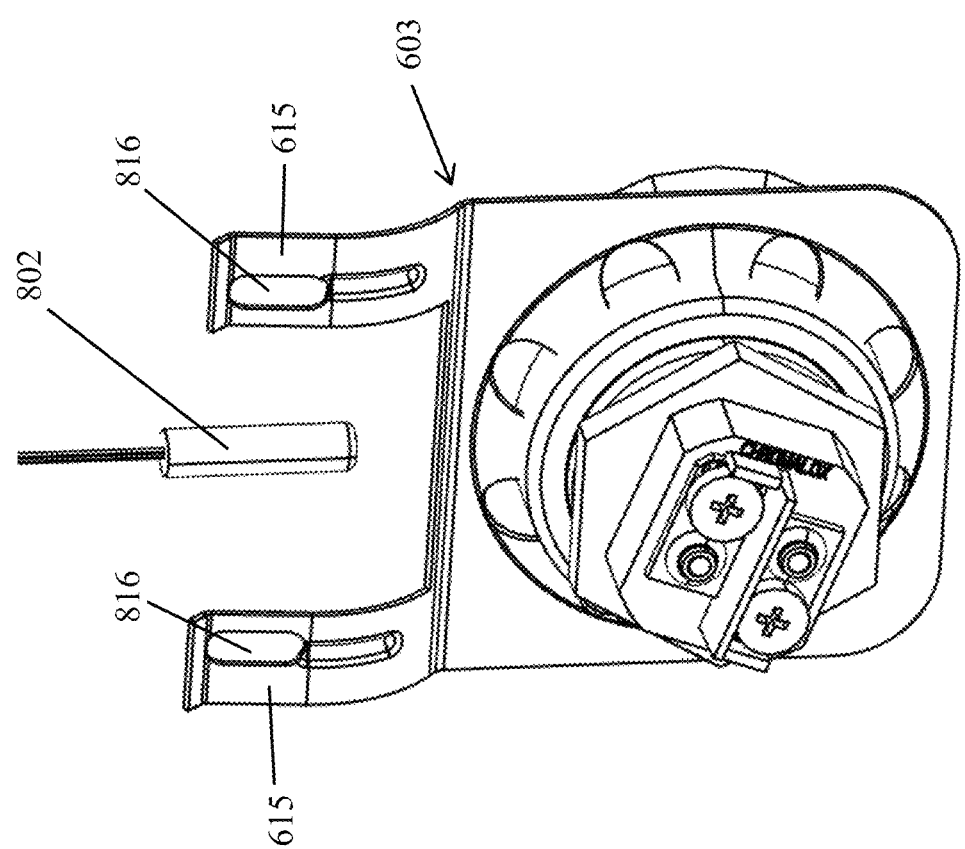
FIG. 9 illustrates a bottom portion of the inner storage tank of the water heater with the mounting bracket having been removed therefrom to illustrate the thermistor and the element bracket to which the mounting bracket is coupled, in accordance with example embodiments of the present disclosure.

One of the sidewalls (904a or 904b) may include a hook 908 that is formed therein. The hook 908 may protrude substantially perpendicularly and out from a respective side wall (904a or 904b) as illustrated in FIGS. 9 and 10. The hook 908 may be configured to securely hold and route the portion of the leak sensor 152 that is in the insulation cavity 1201 towards the controller 505 of the water heater 500. In certain example embodiments, the hook 908 may be shaped such that the leak sensor 152 or any other appropriate conduit can be secured thereto (e.g., snapped therein) such that the leak sensor 152 or other appropriate conduit is held in a vertical orientation within the insulation cavity 1201 as the leak sensor 152 or other appropriate conduit is routed to a destination (e.g., controller 505). In other example embodiments, the mounting bracket may have any other appropriate securement feature that can securely hold and route the leak sensor or a vertical conduit to a desired destination such as the controller 505 of the water heater 500.

In addition to securely holding and routing the portion of the leak sensor 152 that is in the insulation cavity 1201, the mounting bracket 602 also includes features that are configured to hold a thermistor 802 against the outer surface of the inner storage tank 601 and to mount an element protective cover 605 thereto. As such, the base 902 may include a window opening 903 and a first tab feature 905 that extends along a perimeter of the window opening 903. The first tab feature 905 may extend away from the base 902 in a second direction 920. The first tab feature 905 may be configured to receive and securely hold a thermistor 802 therein by snapping the thermistor into a securement cavity 1002 formed by the first tab feature 905. The securement cavity 1002 may be configured based on the shape of the thermistor 802 such that the securement cavity 1002 partially surrounds the thermistor 802. For example, as illustrated in FIGS. 6-11, the securement cavity 1002 may have a substantially C-shaped profile based on the cylindrical profile of the thermistor 802. In other example embodiments, the securement cavity 1002 defined by the first tab feature 905 may have any other appropriate shape to securely retain the thermistor therein such that the thermistor is not easily decoupled from the mounting bracket 602. Further, the securement cavity 1002 may be configured such that the thermistor 802 cannot be inserted therein and removed therefrom without applying a certain amount of force or pressure, e.g., manually pushing it in or pulling it out using fingers.

Further, the first tab feature 905 may removably couple the thermistor 802 to securement cavity 1002 defined by the first tab feature 905 such that the thermistor 802 is visible through the window opening 903 when the thermistor is coupled to the mounting bracket 602. Further, the first tab feature 905 may be configured to hold the thermistor 802 in place against the surface of the inner storage tank 601 such that there is a contact between the thermistor 802 and the surface of the inner storage tank 601 when the mounting bracket 602 is coupled to the inner storage tank 601. The thermistor 802 may be configured to measure and provide temperature readings from the surface of the inner storage tank 601 to indicate when water heating is needed for the efficient functioning of the water heater 500.

Further, each sidewall (904a, 904b) of the pair of sidewalls 904 of the mounting bracket 602 may include a second tab feature 906. Each second tab feature 906 may include two tabs (906a, 906b) that protrude out from the sidewalls (904a, 904b). The tabs (906a, 906b) of the second tab feature 906 may be configured to mate with complementary coupling features of an element protective cover 605 to removably couple the element protective cover 605 thereto. As illustrated in FIGS. 6-8, the second tab feature 906 of the mounting bracket 602 may be configured to couple the element protective cover 605 to the inner storage tank 601 of the water heater such that the element protective cover 605 is disposed over and covers the terminals 701 (illustrated in FIG. 8) of the lower heating element 604 of the water heater 500. The element protective cover 605 may be provided for the safety of the user or technician.

One of ordinary skill in the art can understand and appreciate that in addition to the components described above, the water heater 500 may include many other additional components such as, dip tubes, plumbing, drain pipes, burners, etc. Said additional components may not described herein to avoid obscuring the features of the leak detection system of the water heater. Further, in certain example embodiments, the second gasket 202 of the bottom end assembly 160 may be optional. Furthermore, in certain example embodiments, the sensor guiding tube 153, the leak sensor 152, and/or the transport element 154 may be flexible.

Although example embodiments are described herein, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A water heater comprising:
   a tank assembly comprising:
   an inner storage tank; and
   an outer jacket disposed peripherally around the inner storage tank such that an insulation cavity is defined between the inner storage tank and the outer jacket;
   a bottom pan disposed below the tank assembly such that the bottom pan serves as a base of the water heater;
   a bottom pad that is disposed between the tank assembly and the bottom pan; and
   a gasket coupled to the bottom pad between the bottom pad and the bottom pan,
   wherein the bottom pad creates a seal that prevents leaking of an insulation material from the insulation cavity to the bottom pan,
   wherein the bottom pad defines a recessed portion facing the bottom pan, the recessed portion defining an aperture that is configured to internally route a leak sensor assembly of the water heater from the bottom pan, through the insulation cavity, and to a controller of the water heater,
   wherein the gasket is configured to fit within the recessed portion of the bottom pad.

2. The water heater of claim 1, wherein the leak sensor assembly comprises:
   a wicking tube that is disposed in the bottom pan and extends around a periphery of the bottom pan;
   a sensor tube that is coupled to the wicking tube; and
   a leak sensor that is disposed in the sensor tube and extends into the wicking tube at a first end thereof, an opposite second end of the leak sensor being coupled to the controller.

3. The water heater of claim 2, wherein the sensor tube extends from the wicking tube to the insulation cavity through the aperture in the bottom pad.

4. The water heater of claim 1, wherein the gasket is a first gasket, the water heater further comprising:
   a second gasket that is coupled to the bottom pan and disposed below the first gasket.

5. The water heater of claim 1, wherein the first gasket comprises another aperture that is smaller than the aperture in the bottom pad.

6. The water heater of claim 5, wherein from the bottom pan, a sensor tube of the leak sensor assembly extends between the first gasket and the second gasket, through the other aperture, and the aperture into the insulation cavity.

7. The water heater of claim 5, wherein the first gasket is disposed in the recessed portion of the bottom pad such that the other aperture of the first gasket is axially aligned with the aperture of the bottom pad.

8. The water heater of claim 1, further comprising a mounting bracket that is coupled to the inner storage tank and configured to securely hold and route a portion of the leak sensor assembly that is disposed in the insulation cavity towards the controller of the water heater.

9. The water heater of claim 8, wherein the mounting bracket comprises:
   a first tab feature that is configured to securely hold a thermistor therein and against an outer surface of the inner storage tank, and
   a second tab feature that is configured to mount an element protective cover thereto such that the element protective cover is disposed over terminals of a heating element of the water heater.

10. The water heater of claim 8, wherein the mounting bracket comprises a hook feature that protrudes from a sidewall of the mounting bracket, and wherein the hook feature is configured to securely hold and route the portion of the leak sensor assembly towards the controller.

11. The water heater of claim 8, wherein the mounting bracket is installed adjacent to a heating element of the water heater.

12. The water heater of claim 1, wherein the gasket substantially matches the recessed portion in shape.

13. The water heater of claim 1, wherein the gasket and the recessed portion each define a segment of a disk extending to a periphery of the bottom pad.

14. A water heater comprising:
    a tank assembly comprising:
    an inner storage tank; and
    an outer jacket disposed peripherally around the inner storage tank such that an insulation cavity is defined between the inner storage tank and the outer jacket;
    a bottom end assembly that defines a base of the water heater, the bottom end assembly comprising:
    a bottom pan disposed below the tank assembly;
    a bottom pad that is disposed between the tank assembly and the bottom pan, and
    a gasket coupled to the bottom pad between the bottom pad and the bottom pan,
    wherein the bottom pad creates a seal that prevents leaking of an insulation material from the insulation cavity to the bottom pan and defines a recessed portion facing the bottom pan and defining an aperture that is configured to internally route a leak sensor assembly of the water heater from the bottom pan to a controller of the water heater through the insulation cavity of the water heater, wherein the gasket is configured to fit within the recessed portion of the bottom pad; and
    a mounting bracket that is coupled to the inner storage tank and configured to securely hold and route a portion of the leak sensor assembly that is disposed in the insulation cavity towards the controller of the water heater.

15. The water heater of claim 14, wherein the leak sensor assembly comprises:
    a wicking tube that is disposed in the bottom pan and extends around a periphery of the bottom pan;
    a sensor tube that is coupled to the wicking tube; and
    a leak sensor that is disposed in the sensor tube and extends into the wicking tube at a first end thereof, an opposite second end of the leak sensor being coupled to the controller.

16. The water heater of claim 15, wherein the sensor tube extends from the wicking tube to the insulation cavity through the aperture in the bottom pad.

17. The water heater of claim 14, wherein the gasket is a first gasket, wherein the bottom end assembly further comprises:
    a second gasket that is coupled to the bottom pan and disposed below the first gasket,
    wherein the first gasket comprises another aperture that is smaller than the aperture in the bottom pad.

18. The water heater of claim 14, wherein the mounting bracket comprises:
    a first tab feature that is configured to securely hold a thermistor therein and against an outer surface of the inner storage tank, and
    a second tab feature that is configured to mount an element protective cover thereto such that the element protective cover is disposed over terminals of a heating element of the water heater.

19. The water heater of claim 14, wherein the mounting bracket comprises a hook feature that protrudes from a sidewall of the mounting bracket, and wherein the hook feature is configured to securely hold and route the portion of the leak sensor assembly towards the controller.

20. The water heater of claim 14, wherein the mounting bracket is installed adjacent to a heating element of the water heater.

* * * * *